(12) United States Patent
Koh

(10) Patent No.: US 7,259,772 B2
(45) Date of Patent: Aug. 21, 2007

(54) APPARATUS, METHOD, AND MEDIUM FOR CONTROLLING IMAGE ORIENTATION

(75) Inventor: Ho Jin Koh, Gumi-si (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 10/936,477

(22) Filed: Sep. 9, 2004

(65) Prior Publication Data

US 2006/0033760 A1 Feb. 16, 2006

(30) Foreign Application Priority Data

Aug. 16, 2004 (KR) ...................... 10-2004-0064155

(51) Int. Cl.
*G09G 5/00* (2006.01)

(52) U.S. Cl. .................................................. 345/659

(58) Field of Classification Search ................ 345/649, 345/659
See application file for complete search history.

(56) References Cited

U.S. PATENT DOCUMENTS

| | | | |
|---|---|---|---|
| 4,381,368 A | | 4/1983 | Spurlock ...................... 524/598 |
| 4,831,368 A | | 5/1989 | Masimo et al. .............. 340/720 |
| 5,189,404 A | * | 2/1993 | Masimo et al. .............. 345/659 |
| 5,315,377 A | * | 5/1994 | Isono et al. .................... 348/51 |
| 5,536,930 A | * | 7/1996 | Barkan et al. ......... 235/472.01 |
| 5,672,840 A | * | 9/1997 | Sage et al. .................. 89/41.01 |
| 5,973,664 A | * | 10/1999 | Badger ........................ 345/659 |
| 5,986,634 A | * | 11/1999 | Alioshin et al. ............. 345/649 |
| 6,011,585 A | | 1/2000 | Anderson .................... 348/272 |
| 6,115,025 A | * | 9/2000 | Buxton et al. ............... 345/659 |
| 6,137,468 A | * | 10/2000 | Martinez et al. ............. 345/649 |
| 6,208,325 B1 | * | 3/2001 | Reddy et al. ................ 345/658 |
| 6,266,236 B1 | * | 7/2001 | Ku et al. ..................... 361/681 |
| 6,359,603 B1 | * | 3/2002 | Zwern ............................ 345/8 |
| 6,441,828 B1 | * | 8/2002 | Oba et al. .................... 345/659 |
| 6,563,535 B1 | | 5/2003 | Anderson ................. 348/231.2 |
| 6,567,101 B1 | * | 5/2003 | Thomas ....................... 345/649 |
| 6,639,603 B1 | * | 10/2003 | Ishii ............................ 345/568 |
| 6,828,962 B1 | * | 12/2004 | McConkie et al. ........... 345/419 |
| 6,897,882 B1 | * | 5/2005 | Kim ............................. 345/659 |
| 6,935,777 B2 | * | 8/2005 | Liu et al. ..................... 374/208 |
| 6,982,728 B1 | * | 1/2006 | Nicolas et al. .............. 345/649 |
| 7,170,534 B2 | * | 1/2007 | Son et al. .................... 345/659 |
| 2003/0223576 A1 | | 12/2003 | Hideo ................... 379/433.04 |
| 2003/0223579 A1 | | 12/2003 | Kanter et al. | |
| 2003/0231189 A1 | * | 12/2003 | Williams .................... 345/659 |
| 2003/0234797 A1 | * | 12/2003 | Williams et al. ............ 345/649 |
| 2004/0201595 A1 | * | 10/2004 | Manchester ................. 345/649 |
| 2005/0152109 A1 | * | 7/2005 | Choi et al. .................. 361/683 |
| 2006/0001671 A1 | * | 1/2006 | Kamijo et al. .............. 345/531 |

OTHER PUBLICATIONS

Australian Office Action dated Aug. 3, 2006.
Australian Office Action dated Jan. 31, 2006.
Russian Office Action dated Oct. 6, 2005.

* cited by examiner

*Primary Examiner*—Ryan Yang
(74) *Attorney, Agent, or Firm*—Ked & Associates, LLP

(57) ABSTRACT

An apparatus, method, and medium for controlling image orientation are disclosed. An orientation mode detector measures multi-directional rotational angles of a display panel and determines an orientation mode for original image data based on the measured rotational angles. A system memory stores orientation parameters corresponding to a plurality of image orientation modes. A system controller initially acquires information indicating the orientation mode from the orientation mode detector, and it extracts orientation parameters corresponding to the acquired information from the system memory. Finally, a driver changes an orientation of the original image data according to the extracted orientation parameters.

25 Claims, 12 Drawing Sheets

180° Rotation in 1st direction

Normal mode

1st orientation mode

2nd orientation mode

3rd orientation mode

4th orientation mode mirror mode

5th orientation mode

6th orientation mode

7th orientation mode

8th orientation mode

APPARATUS, METHOD, AND MEDIUM FOR CONTROLLING IMAGE ORIENTATION

This application claims the benefit of Korean Patent Application No. 10-2004-0064155, filed on Aug. 16, 2004, which is hereby incorporated by reference as if fully set forth herein.

BACKGROUND OF THE INVENTION

1. Field of the Invention

The present invention relates to a display system, and more particularly, to an apparatus, a method, and medium for controlling image orientation. Although the present invention is suitable for a wide scope of applications, it is particularly suitable for providing a display system having a display panel rotatable in multiple directions.

2. Discussion of the Related Art

Generally, a display system carries out many roles for easily providing users with all types of images including graphic images, character images, and so on. Also, the display system displays the images in a landscape format. More specifically, the landscape format displays the image so that the longitudinal length is larger than the vertical length. However, despite the convenience provided to the users, depending upon the computer applications such display formats (i.e., landscape format) may be inconvenient and disadvantageous. For example, the landscape format may cause inconvenience to users to wish to view documented images having a larger vertical length and a smaller longitudinal length, which may also result in a waste of empty space on each side of the image being displayed. In this case, the user would rather prefer to view the image in a portrait format, wherein the vertical length of the image is larger than the longitudinal length.

Therefore, in order to meet with the demands of the user to view an image in both the landscape format and the portrait format, a display system rotating the image to a direction desired by the user has been developed. The display system for rotating images should include a display panel that can be horizontally or vertically rotated, and a software and a hardware that can adequately modify the display direction of the displayed image, depending upon the rotation of the display panel.

In a conventional display system for rotating images, when the user desires to rotate the display panel to 90 degrees (90°) to view the image in a portrait format, the user uses a remote controller or a function key on the display panel in order to set up the image display direction to a 90° rotation mode. Accordingly, the image is rotated to 90 degrees (90°) through the software and hardware related to image rotation, thereby being displayed in the portrait format. Conversely, when the user desires to rotate the image rotated to 90 degrees (90°) once again, so as to view the image in the landscape format, then the user uses the remote controller or the function key on the display panel in order to set up the image display direction to a 0° rotation mode. Accordingly, the image is rotated back to its initial state through the software and hardware related to image rotation, thereby being displayed in the landscape format.

However, the conventional display system is disadvantageous in that the user is required to set up the display direction of the image each time the display panel is rotated. Also, if the user is unable to capture the correct rotational angle, then the user has to activate repeat image rotation mode several times before being able to view the image as desired. Furthermore, the display panel of the related art display system can rotate in only one direction, and accordingly, the image is rotated in only one direction. Therefore, the development of a display device and method enabling the image to be rotated in many directions is required.

SUMMARY OF THE INVENTION

Accordingly, the present invention is directed to an apparatus, a method, and medium for controlling image orientation that substantially obviate one or more problems due to limitations and disadvantages of the related art.

An object of the present invention is to provide an apparatus, a method, and medium for controlling image orientation that can provide an optimum automatic orientation of an image depending upon a multi-directional rotation of a display panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling an orientation of image data in a display system having a display panel includes the steps of determining an orientation mode for original image data based on rotational angles of the display panel in multi-directions, and extracting orientation parameters corresponding to the determined orientation mode. The method further includes the steps of changing an orientation of the original image data according to the extracted orientation parameters, storing the orientation-changed image data in a memory, and displaying the stored image data on a display screen.

In another aspect of the present invention, an apparatus of controlling an orientation of image data includes a display panel rotatable in multi-directions, and an orientation mode detector configured to measure multi-directional rotational angles of the display panel, and to determine an orientation mode for original image data based on the measured rotational angles. The apparatus further includes a system memory configured to store orientation parameters corresponding to a plurality of image orientation modes, and a system controller configured to acquire information indicating the determined image orientation mode from the orientation mode detector, and to extract orientation parameters corresponding to the acquired information. The apparatus further includes a driver configured to change an orientation of the original image data according to the extracted orientation parameters, wherein the orientation-changed image data is stored in the system memory and is displayed on a display screen.

The orientation mode detector includes at least one sensor configured to measure the multi-directional rotational angles of the display panel, a display controller configured to determine the orientation mode for the original image data based on the measured rotational angles, and a display memory configured to store the information indicating the determined orientation mode, wherein the display controller sends an acknowledgement to the system controller when a request for access to the display memory is received.

In another aspect of the present invention, a computer-readable medium stores program code for determining an orientation mode for original image data in a display system. The program code, when executed by a processor, causing the processor to perform the steps of (a) rotating, by a user, the display panel in at least one of a first direction and a second direction; (b) determining whether the display panel is rotated in the first direction; and (c) when the determination in step (b) is true, determining whether a first rotational angle of the display panel in the first direction is 90 degrees. The program code further causes the processor to perform the steps of (d) when the determination in step (c) is true, determining whether the display panel is rotated in the second direction; (e) when the determination in step (d) is true, determining whether a second rotational angle of the display panel in the second direction is 180 degrees; (f) when the determination in step (e) is true, storing an orientation mode of 270 degrees in a memory; (g) determining whether a request for access to the memory has been received from an image orientation controller; and (h) when the request is made, transmitting an acknowledgement to the image orientation controller for authorizing access to the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
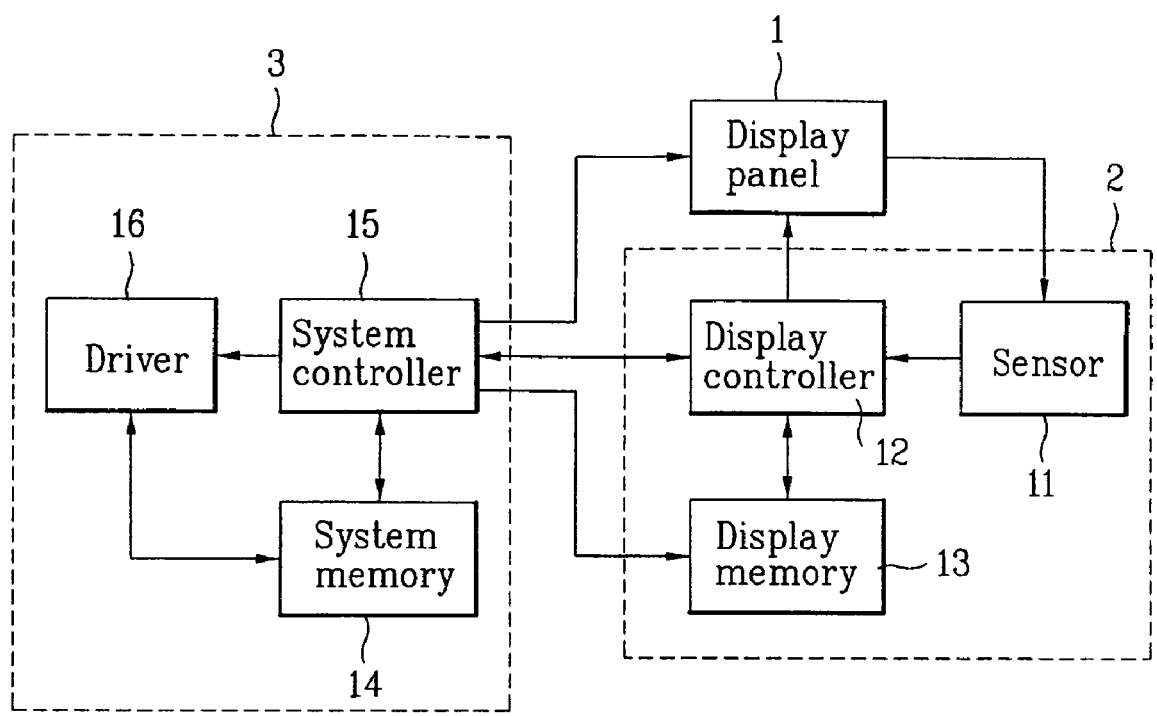
FIG. 1 illustrates a block diagram of an apparatus for controlling image orientation according to the present invention.
Figure 2:
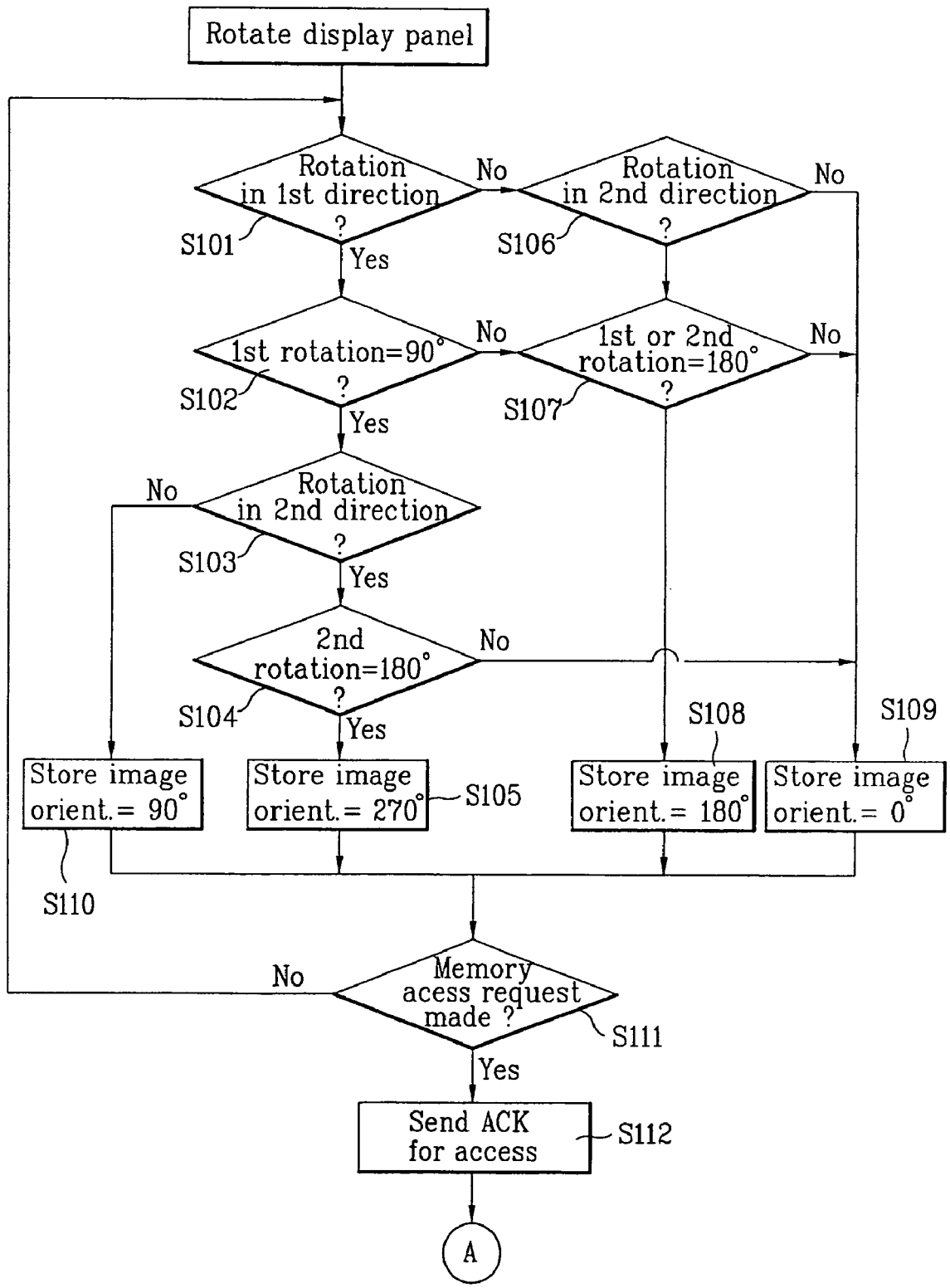
FIGS. 2 and 3 illustrate flow charts showing process steps of a method for controlling image orientation according to the present invention.
Figure 3:
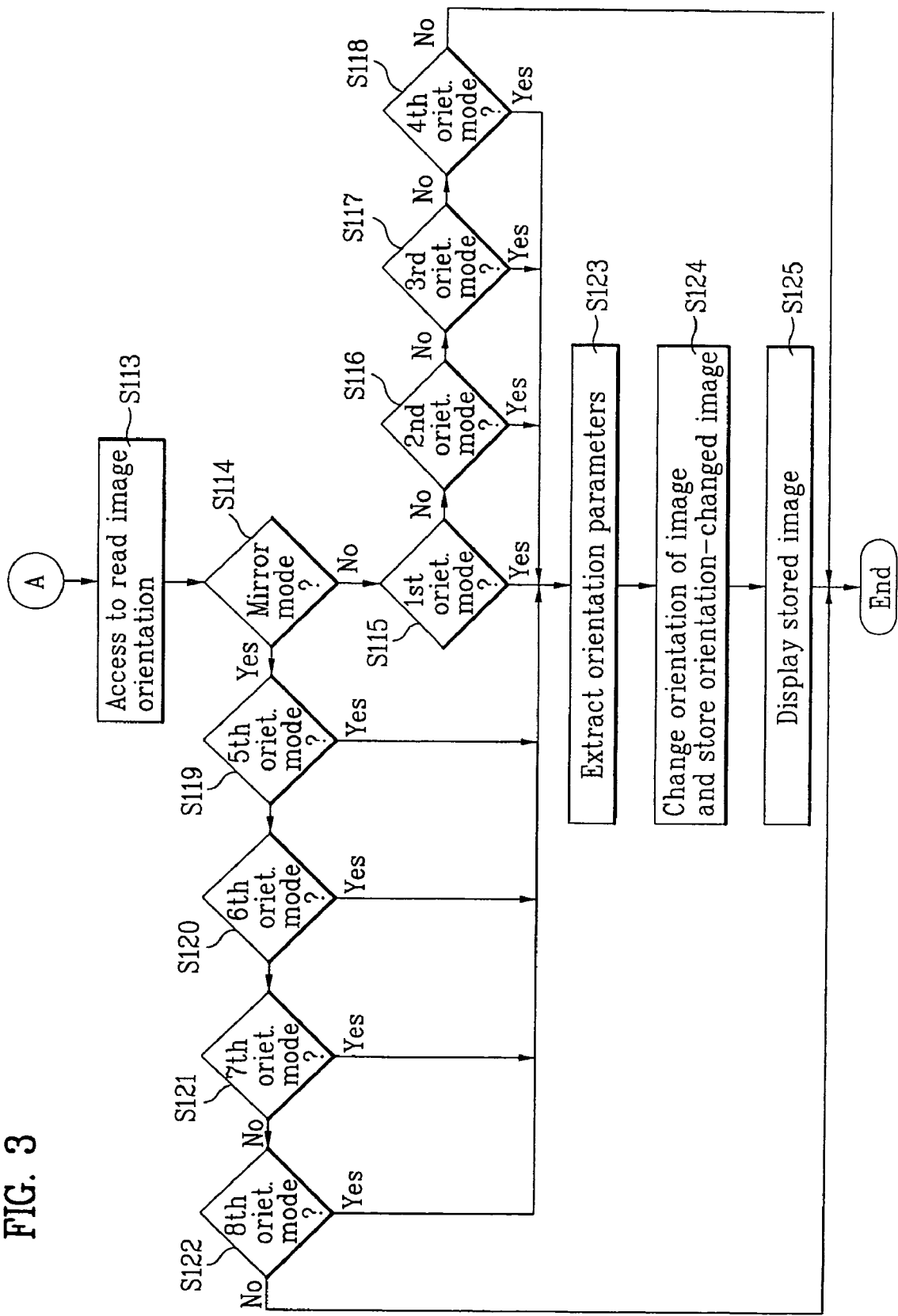

The purpose of the present invention is to automatically detect rotational angles of a display panel, which is rotatable in multiple directions, such as a first rotational direction and a second rotational direction, and to optimally display an image by automatically controlling the image orientation depending upon the detected rotational angles. FIG. 1 illustrates a block diagram of an apparatus for controlling image orientation according to the present invention. And, FIGS. 2 and 3 illustrate a flow chart showing process steps of a method for controlling image orientation according to the present invention. Referring to FIG. 1, the apparatus for controlling image orientation according to the present invention includes a display panel 1, an orientation mode detector 2, and an image orientation controller 3. Herein, the display panel is rotatable in multiple directions.

Figure 4A:
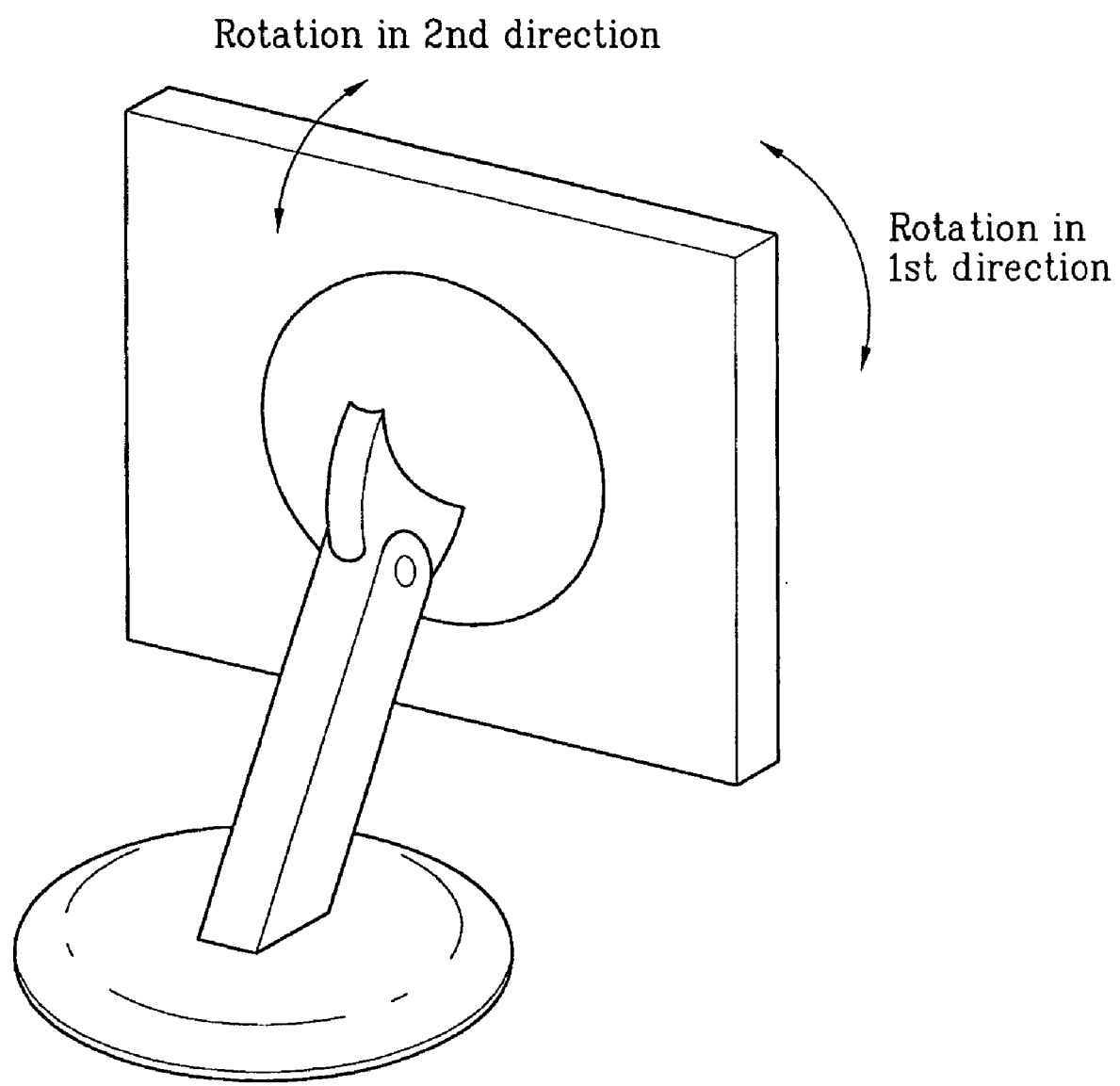
FIGS. 4A to 4C illustrate examples of a display panel according to the present invention.
Figure 4B:
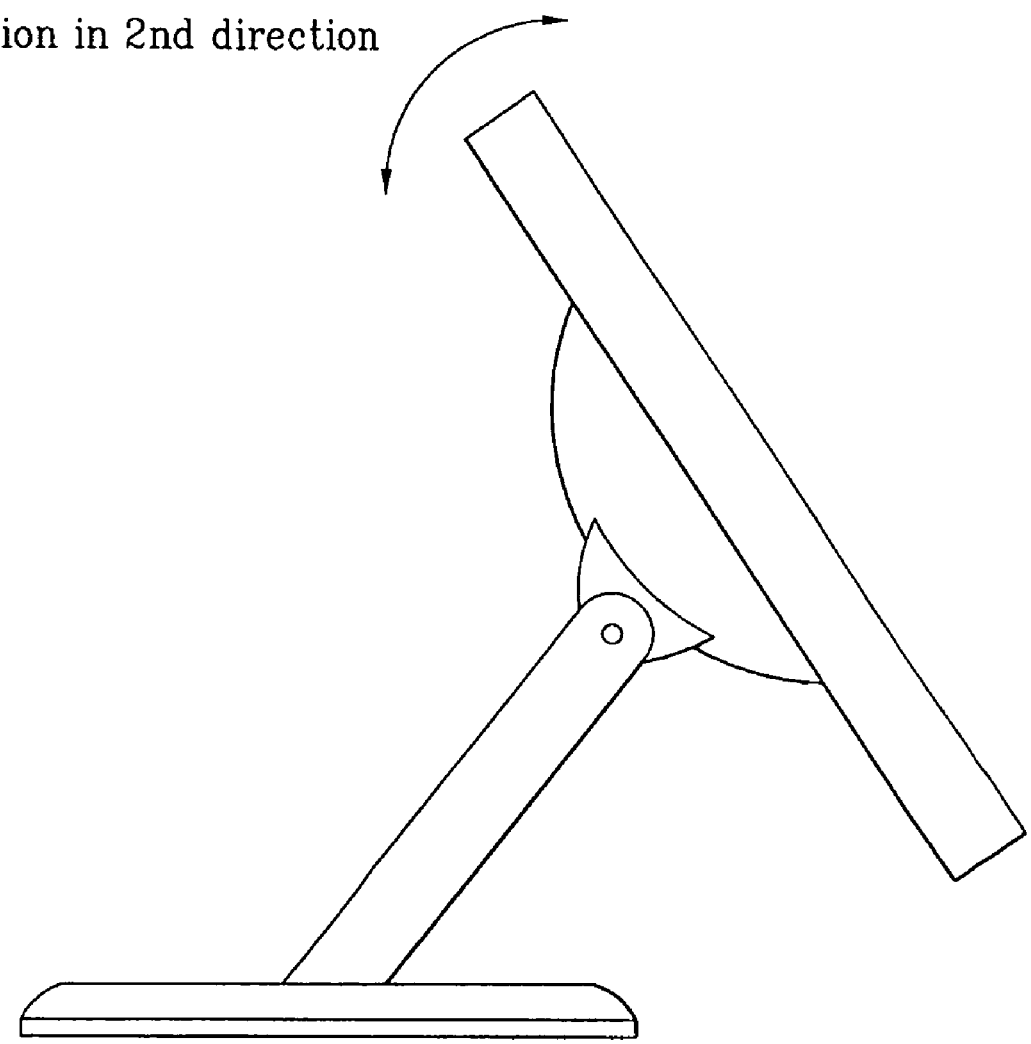
Figure 4C:
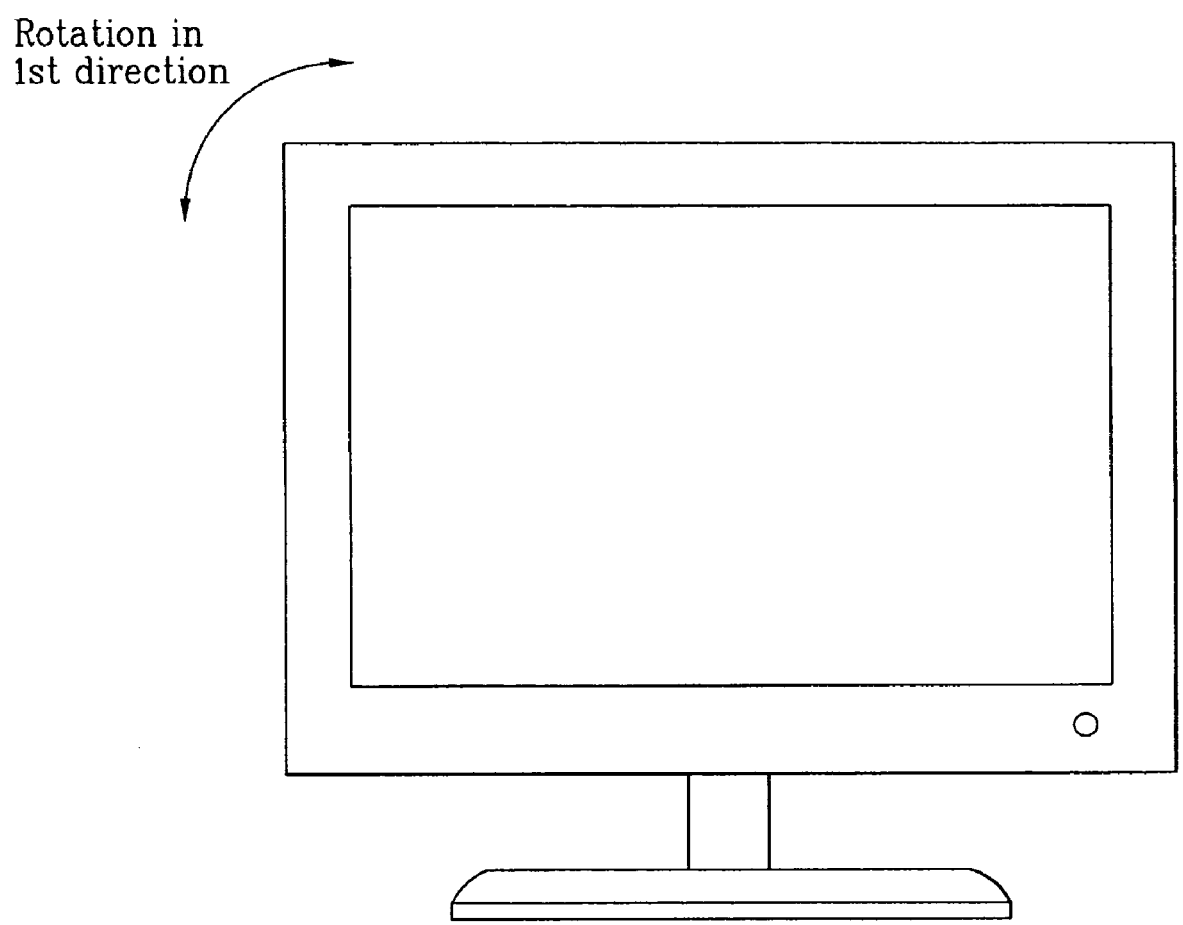

FIGS. 4A to 4C illustrate various views the display panel 1 which is rotatable in multi-directions. More specifically, FIG. 4A is a rear side view of the display panel 1, FIG. 4B is a left-side view of the display panel 1, and FIG. 4C is a front side view of the display panel 1. Referring to FIGS. 4A to 4C, the display panel 1 is rotatable in a first rotational direction and a second rotational direction. More specifically, the display panel is rotatable about an axis perpendicular to the display panel 1 (first rotational direction), as shown in FIGS. 4A and 4C. On the other hand, the display panel is also rotatable about a horizontal axis (second rotational direction), as shown in FIGS. 4A and 4B.

Figure 5A:
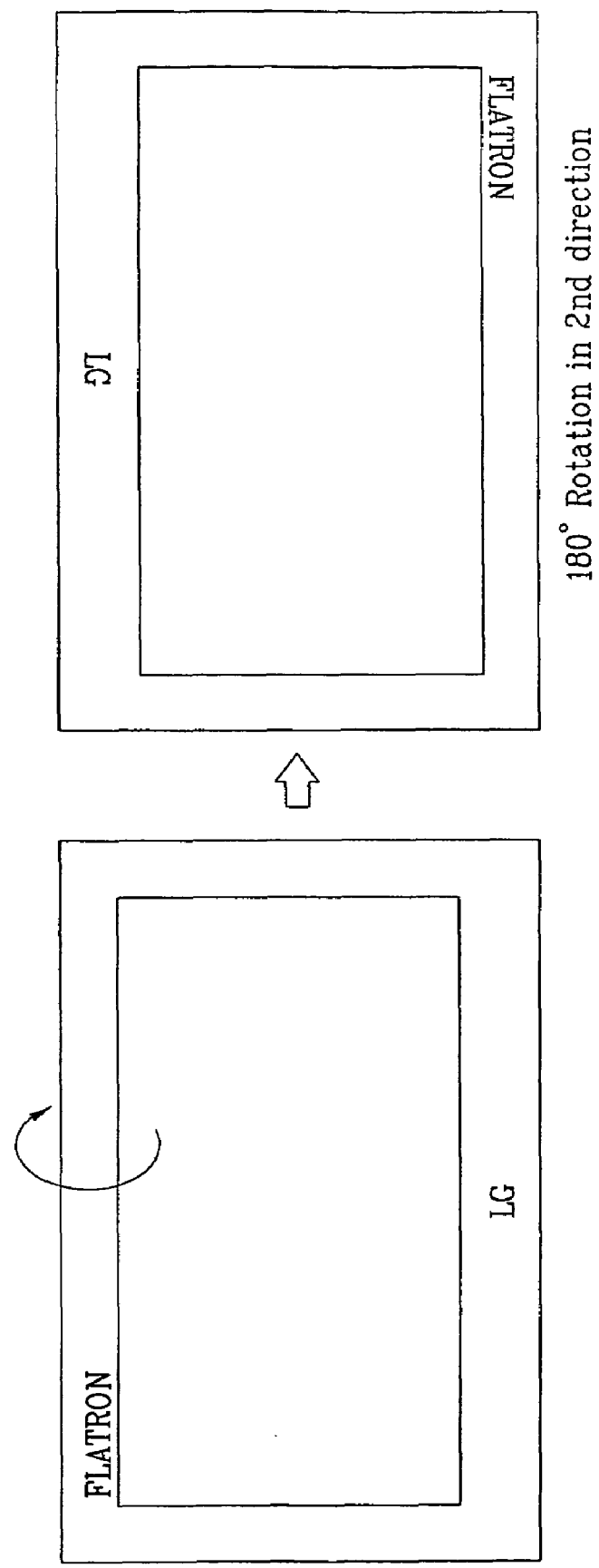
FIGS. 5A to 5C illustrate shapes of the display panel depending upon a rotation angle of the display panel.
Figure 5B:
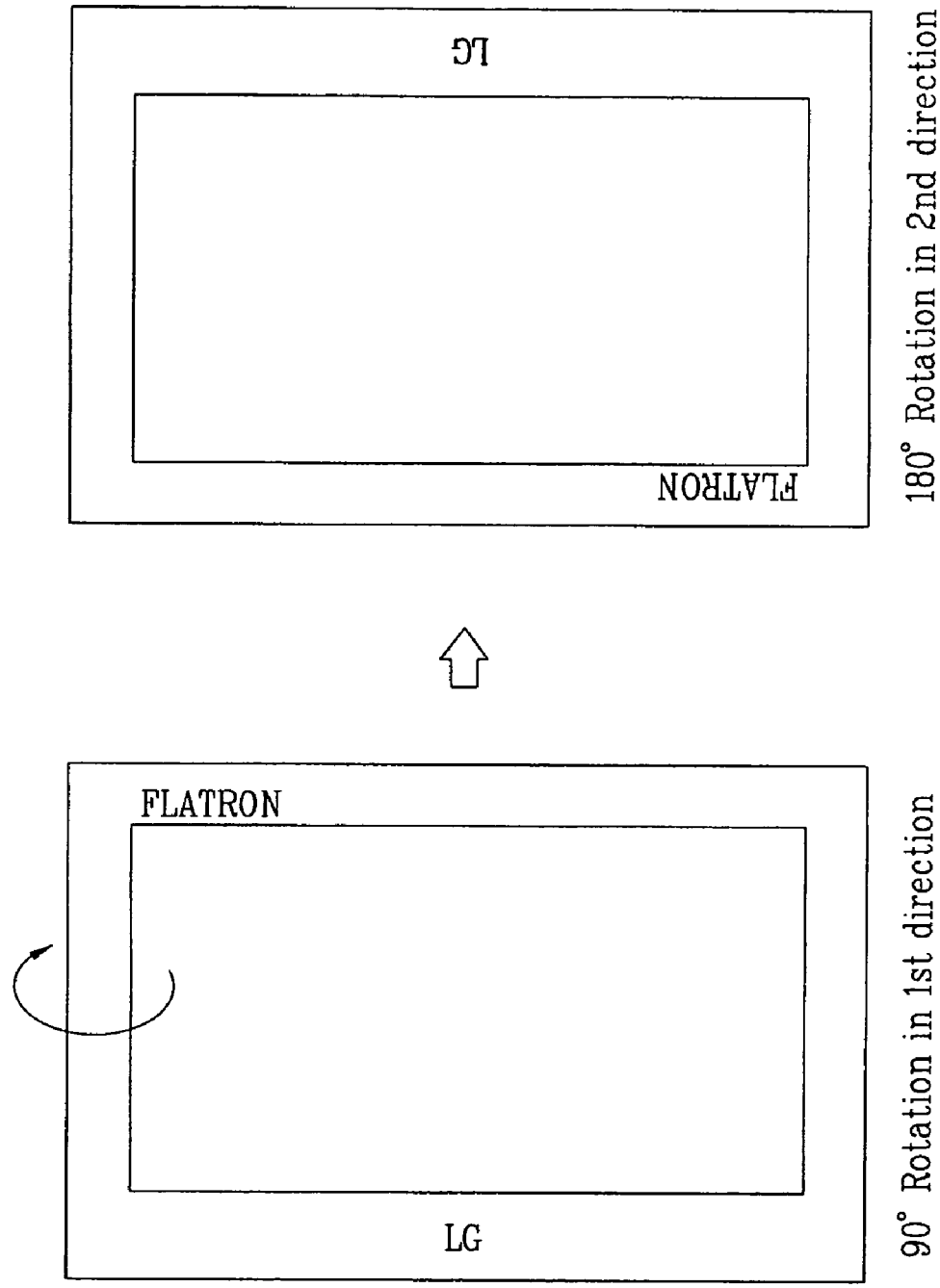
Figure 5C:
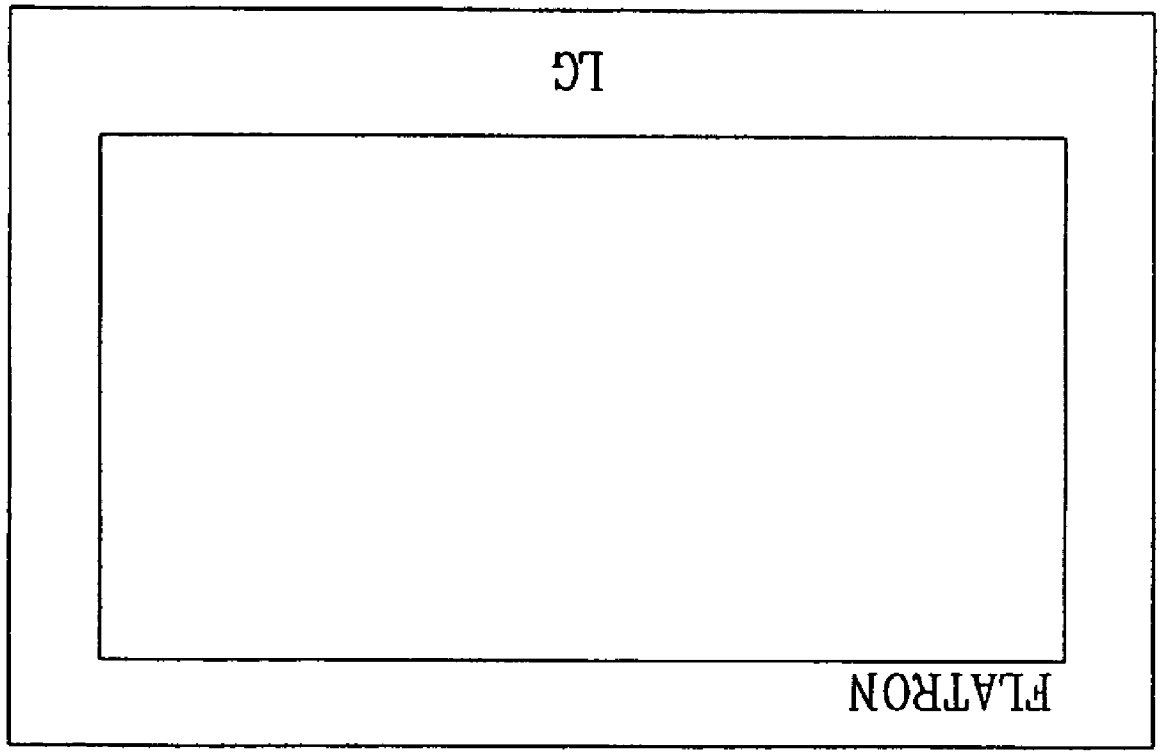

FIGS. 5A to 5C illustrate various orientations of the display panel 1 according to the present invention. FIG. 5A illustrates an orientation of the display panel 1, which is rotated 180 degrees in the second rotational direction. Also, FIG. 5B illustrates orientations of the display panel 1, which is initially rotated 90 degrees in the first direction and is further rotated 180 degrees in the second direction. And, FIG. 5C illustrates an orientation of the display panel 1, which is rotated 180 degrees in the first direction.

Referring back to FIG. 1, the orientation mode detector 2 includes a sensor 11, a displayer controller 12, and a display memory 13. The sensor 11 of the orientation mode detector 2 measures the multi-directional rotational angles of the display panel 1, and it could use any one of a wide range of sensors, such as a gyroscope sensor, a metal shell sensor, an electrical conduction detection switch, a mechanical conversion switch, and so on. The sensor using the conduction detection switch is used in the present invention.

Figure 6A:
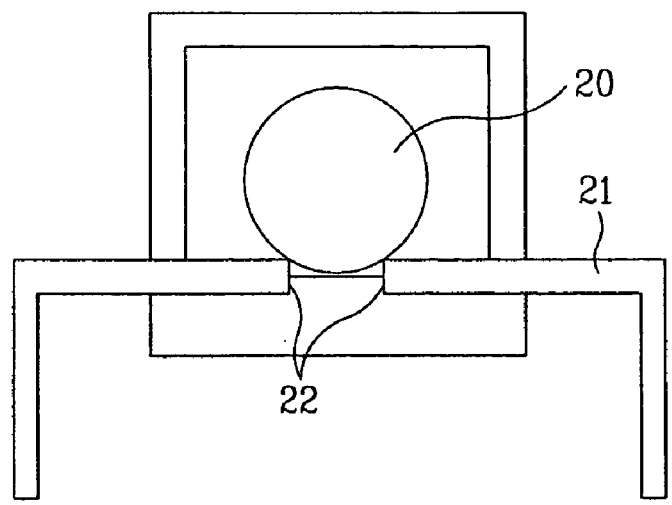
FIGS. 6A and 6B illustrate a conduction detecting switch.
Figure 6B:
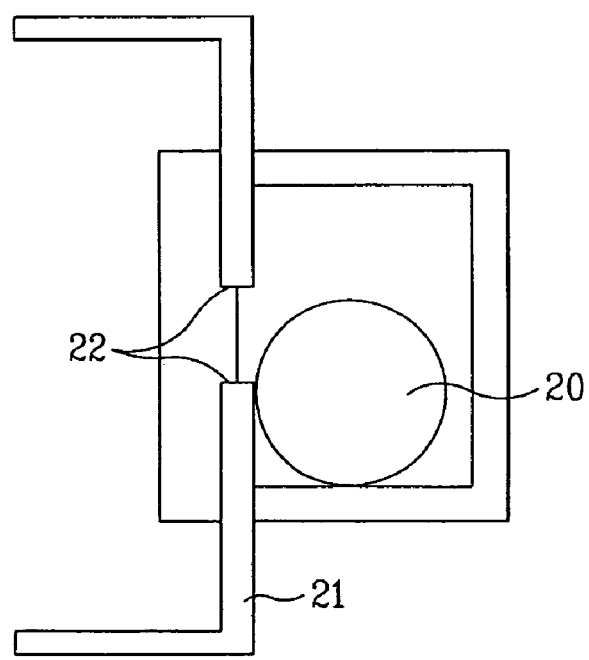

FIGS. 6A and 6B illustrate an electrical conduction detecting switch. More specifically, FIG. 6A illustrates a condition whereby an electric current is flowing, and FIG. 6B illustrates a condition whereby the electric current is cut-off. Referring to FIG. 6A, the electric current is flown through as a conductive ball 20 comes into contact with a contact point 22 of a terminal 21. Conversely, the electric current cut-off as the conductive ball 20 is out of contact with the contact point 22 of the terminal 21, as shown in FIG. 6B.

Figure 7:
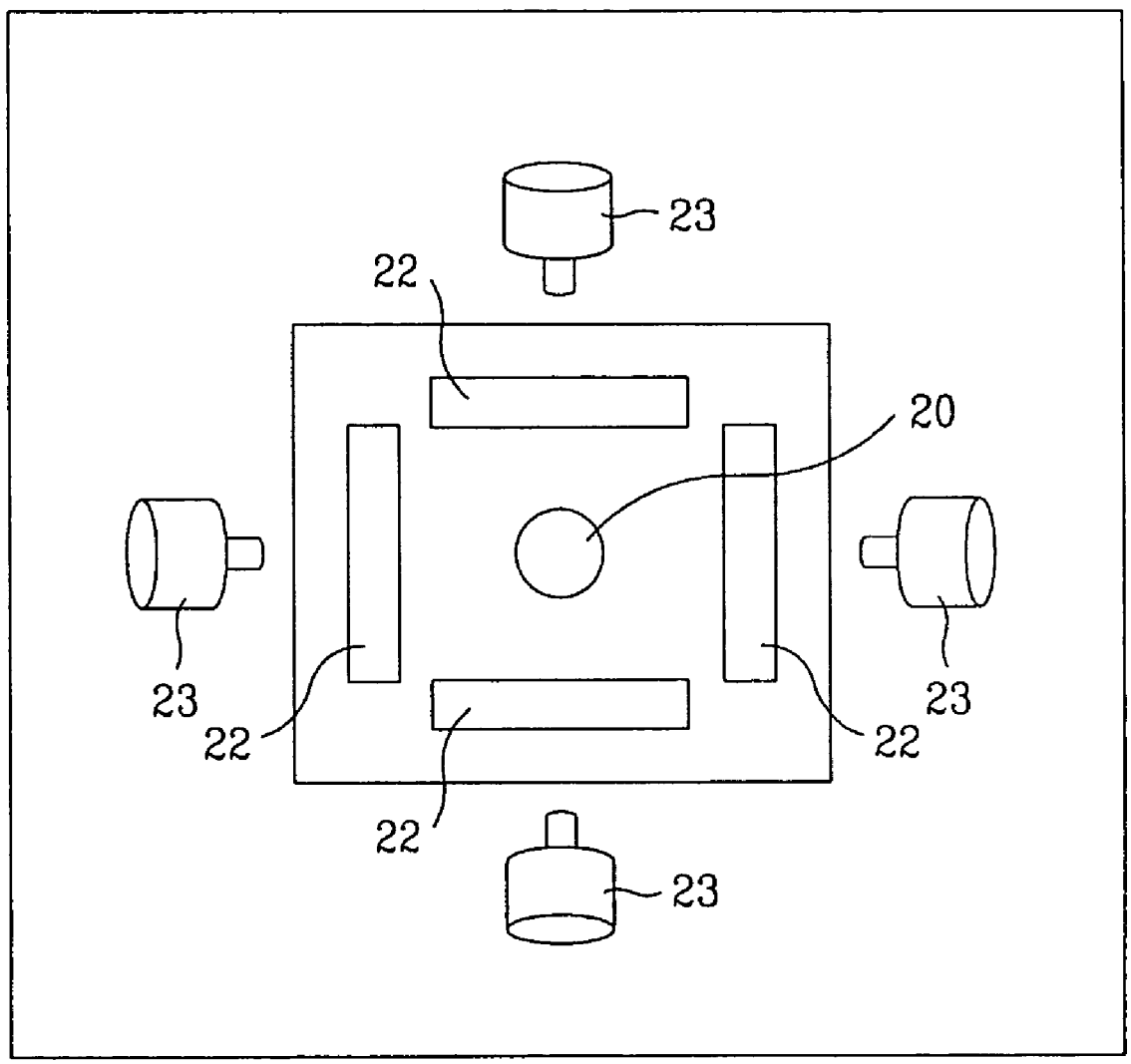
FIG. 7 illustrates an example of a sensor used in the apparatus for controlling image orientation according to the present invention.

FIG. 7 illustrates an example of a sensor used in the apparatus for controlling image orientation according to the present invention. Referring to FIG. 7, a contact point 22 is located at each side portion of the sensor, and the conductive ball 20 moves along the inclination of the sensor. As the conductive ball 20 moves along the inclined surface of the sensor, the contact point 22 coming into contact with the conductive ball 20 is changed. Moreover, the flow of electric current in each contact point 22 can either be opened or cut-off due to the conductive ball 20, thereby changing the flow of the electric current. Therefore, since the current flow is changed in accordance with the inclination of the sensor, the user can sense the current flow at the sensor so as to detect the inclination.

More specifically, when the sensor, shown in FIG. 7, is attached to the display panel, the user can detect the rotational angle of the display panel. In some cases, the user may place a light emitting diode 23 near each contact point 22 of the sensor, in order to verify whether an electric current is flowing through each contact point 22. The user may also increase the number of contact points 22 so that the rotational angle can be detected more accurately.

Alternatively, the present invention may also include a first sensor sensing only the rotational angle of the first direction mode, and a second senor sensing only the rotational angle of the second direction mode. In this case, each sensor may sense a more accurate rotational angle, so as to detect only the rotational angle of a corresponding mode.

Also, the display memory 13 shown in FIG. 1 stores the measured rotational angles of the display panel 1. Moreover, the display controller 12 determines an orientation mode for original image data based on the measured rotational angles, and stores the determined orientation mode in the display memory 13. Then, when the image orientation controller 3 sends a request to the display controller 12 for accessing to the display memory 13 to acquire the orientation mode information, the display controller 12 sends an acknowledgement to the image orientation controller 3 to authorize the access. The orientation mode determined by the display controller 12 is any one of 0, 90, 180, and 270 degrees, and information indicating the orientation mode is stored in the display memory 13.

Furthermore, the image orientation controller 3 includes a system memory 14, a system controller 15, and a driver 16. Herein the system memory 14 stores orientation parameters corresponding to a plurality of orientation modes. Also, the system controller 15 acquires the orientation mode information for the original image data determined by the orientation mode detector 2 by accessing to the display memory 13. Then, it extracts orientation parameters corresponding to the acquired orientation mode information. And, the extracted orientation parameters are supplied to the driver 16. Herein, the orientation parameters supplied to the driver 16 may consist of information on an image starting position, an image ending position, and a scan direction, which correspond to the orientation mode information. The image orientation parameters may vary depending upon the image orientation mode information stored in the system memory 14. In the present invention, the image orientation mode includes first to eighth orientation modes. And so, each image orientation mode has different image orientation parameters.

Figure 8:
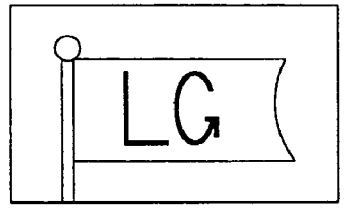
FIG. 8 illustrates examples of various image orientation modes according to the present invention.
Figure 8:
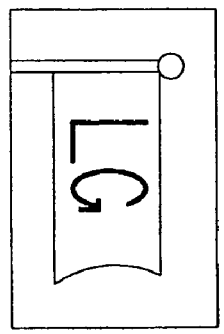
Figure 8:
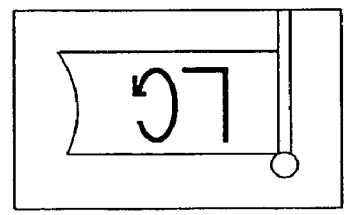
Figure 8:
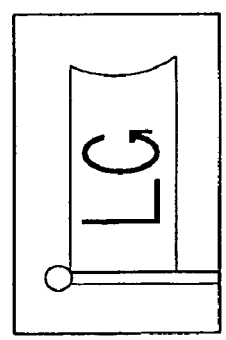
Figure 8:
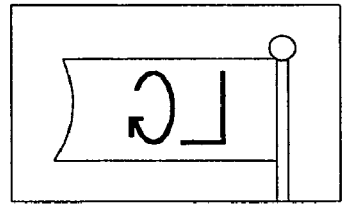
Figure 8:
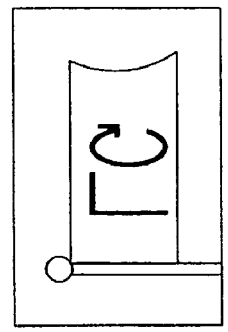
Figure 8:
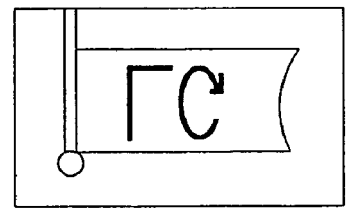
Figure 8:
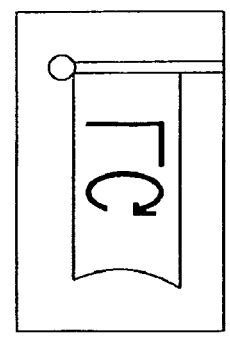

FIG. 8 illustrates examples of various image orientation modes according to the present invention. Referring to FIG. 8, the present invention largely includes a normal mode and a mirror mode, wherein the normal includes first to fourth orientation modes and the mirror mode includes fifth to eighth orientation modes. More specifically, the first orientation mode is the original image, the second orientation mode is the image of the first orientation mode being rotated to 90° clockwise, the third orientation mode is the image of the first orientation mode being rotated to 180° clockwise, and the fourth orientation mode is the image of the first orientation mode being rotated to 270° clockwise. On the other hand, the fifth orientation mode is a mirror of the original image, the sixth orientation mode is the fifth orientation mode being rotated to 90° clockwise, the seventh orientation mode is the image of the fifth orientation mode being rotated to 180° clockwise, and the eighth orientation mode is the image of the fifth orientation mode being rotated to 270° clockwise. Also, the driver 16 modifies the orientation of the original image data in accordance with the extracted image orientation data.

A method for controlling the image orientation according to the present invention will now be described in detail. Referring to FIGS. 2 and 3, after the display panel 1 is rotated in at least one of multi-directions, the display controller 12 determines whether the display panel 1 is rotated in the first rotational direction based on rotational angles measured by the sensor 11 (S101). If the display panel 1 is rotated in the first direction, the display controller 12 determines whether the rotational angle of the display panel in the first direction is 90° (S102).

Subsequently, if the rotational angle in the first direction is 90°, the display controller 12 then determines whether the display panel 1 is rotated in the second rotational direction (S103). If the display panel 1 is rotated in the second direction, the display controller 12 determines whether the rotational angle of the display panel 1 in the second direction is 180° (S104). Thereafter, if the rotational angle in the second direction is 180°, the display controller 12 stores an image orientation mode of 270° in the display memory 13 (S105).

However, if the display controller 12 determines in step S101 that the display panel 1 is not rotated in the first direction, the display controller 12 determines whether the display panel 1 is rotated in the second direction (S106). Then, if the display panel 1 is rotated in the second direction, the display controller 12 determines whether the rotational angle of the display panel 1 in the second direction is 180° (S107). Subsequently, if the rotational angle in the second direction is 180°, the display controller 12 stores an image orientation mode of 180° in the display memory 13 (S108). On the other hand, in S106, if the display panel 1 is not rotated in the second direction, then the display controller 12 stores an image orientation mode of 0° in the display memory 13 (S109).

Additionally, in S102, if the rotational angle in the first direction is not 90°, then the display controller 12 determines whether the rotational angle of the display panel 1 in the first direction is 180° (S107). If the rotational angle in the first direction is 180°, then the display controller 12 stores an image orientation mode of 180° in the display memory (S108). However, if the rotational angle in the first direction is not 180°, then the display controller 12 stores an image orientation mode of 0° in the display memory 13 (S109).

After an image orientation is stored in the display memory 13 in step S110, S105, S108, or S109, the display controller 12 determines whether a request for accessing to the display memory 13 has been received from the system controller 15 (S111). If such request is made, then the display controller 12 authorizes the access to the display memory 13 by transmitting an acknowledgement to the system controller 15 (S112). However, if there is no request made, then the display controller 12 repeats the steps starting from S101.

The system controller 15 of the image orientation controller 3 periodically sends a request to the display controller 12 for acquiring image orientation mode information stored in the display memory 13. Then it reads the information from the display memory 13 when authorized by the display controller 12 (S113). Thereafter, the system controller 15 determines whether the acquired information is a mirror mode (S114). If the information is not a mirror mode, the system controller determines whether the acquired information is any one of the first to fourth orientation modes (S115 to S118). Then, if the acquired information is determined to be any one of the first to fourth orientation modes, the system controller 15 extracts from the system memory 14 the image orientation data corresponding to the orientation mode of the acquired information (S123). However, if the acquired information is determined to correspond to none of the first to fourth orientation modes, then the image orientation controlling process is terminated.

Alternatively, if the information is a mirror mode, the system controller determines whether the acquired information is any one of the fifth to eighth orientation modes (S119 to S122). Then, if the acquired information is determined to be any one of the fifth to eighth orientation modes, the system controller 15 extracts from the system memory 14 the image orientation data corresponding to the orientation mode of the acquired information (S123). However, if the acquired information is determined to correspond to none of the fifth to eighth orientation modes, then the image orientation controlling process is terminated. Furthermore, the driver 16 modifies the orientation of the original image data in accordance with the extracted image orientation data and stores the modified image orientation to the system memory (S124). Finally, the system controller 15 displays the stored image data on the display panel 1 (S125).

As described above, the present invention enables the rotational angle of a display panel, which is rotatable in multiple directions, to be automatically detected and can allow an optimum orientation of the image depending upon the detected rotational angle. Although the present invention is suitable for a wide scope of applications, it is also intended that the present invention covers the modifications and variations of this invention provided they come within the scope of the appended claims and their equivalents. For example, the present invention can be applied in combination with any one of a computer programming software, a firmware, and a hardware. As a preparatory step for fabricating the apparatus according to the present invention or performing the method according to the present invention, a computer programming code (or a software or firmware) according to the present invention, is typically stored in at least one machine-readable memory medium, such as a semiconductor memory including a fixed (or hard) drive, a diskette, an optical disc, a magnetic tape, a read only memory (ROM), a programmable read only memory (PROM), and so on, and products are fabricated by using the same medium.

A fabricated product including a computer programming code are used by directly processing the code from a memory device, by copying the code from the memory device to another memory device, such as a hard disc, a random-access memory (RAM), and so on, or by transmitting the code through a network so as to be processed at remote distances. The method according to the present invention is performed by processing a code included in an adequate standard computer hardware, thereby combining at least one machine-readable memory device including the code according to the present invention. The apparatus performing the aspects of the present invention may be at least one computer and memory system including or having network access to a computer program encoded according to the present invention.

The apparatus, method, and medium for controlling image orientation according to the present invention automatically detects a rotational angle of a display panel, thereby allowing the user to avoid the inconvenience of resetting the image orientation each time an image is viewed. Also, since the image orientation is optimally set in accordance with the detected rotational angle, the user is provided with a more image. Finally, since the image orientation is controlled in accordance with a first mode rotating the display panel either clockwise or counterclockwise along the central axis of the display panel and, also, a second mode rotating the display panel counterclockwise along one of a horizontal axis and a vertical axis of the display panel, the user can view a desired image more conveniently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling an orientation of image data in a display system having a display panel, the method comprising:
   assigning a display orientation to each of a plurality of orientation modes for original image data, each orientation mode for determining a display angle of the original image data, the display angle corresponding to an orientation of the display panel about at least two axes;
   setting the orientation of the display panel;
   selecting one among the plurality of orientation modes based on the set orientation of the display panel;
   extracting orientation parameters corresponding to the selected orientation mode;
   changing, as necessary, an orientation of the original image data according to the extracted orientation parameters and storing the orientation-changed image data in a first memory; and
   displaying the stored image data on a display screen according to the selected orientation mode,
   wherein the orientation mode selecting comprises determining whether a request for access to a second memory, configured to store information indicating the orientation mode, has been received from an image orientation controller and transmitting an acknowledgement to the image orientation controller for authorizing access to the second memory when the request is received.

2. The method of claim 1, wherein said orientation mode selecting further comprises:
   (a) rotating, by a user, the display panel in at least one of a first direction and a second direction, the first direction being about an axis perpendicular to the display panel and the second direction being about a horizontal axis;
   (b) determining whether the display panel is rotated in the first direction;
   (c) when the determination in (b) is true, determining whether a first rotational angle of the display panel in the first direction is 90 degrees;
   (d) when the determination in (c) is true, determining whether the display panel is rotated in the second direction;
   (e) when the determination in (d) is true, determining whether a second rotational angle of the display panel in the second direction is 180 degrees; and
   (f) when the determination in (e) is true, storing an orientation mode of 270 degrees in a second memory.

3. The method of claim 2, wherein said orientation mode selecting further comprises:
   (i) when the determination in (b) is false, determining whether the dislpay panel is rotated in the second direction;
   (j) when the determination in (i) is true, determining whether the second rotational angle is 180 degrees;
   (k) when the determination in (j) is true, storing an orientation mode of 180 degrees in the second memory.

4. The method of claim 3, wherein said orientation mode selecting further comprises:
(l) when the determination in (i) is false, storing an orientation mode of 0 degrees in the second memory.

5. The method of claim 3, wherein the said orientation mode selecting further comprises:
(m) when the determination in (j) is false, storing an orientation mode of 0 degrees in the second memory.

6. The method of claim 2, wherein said orientation mode selecting further comprises:
(n) when the determination in (c) is false, determining whether the first rotational angle is 180 degrees; and
(o) when the determination in (n) is true, storing an orientation mode of 180 degrees.

7. The method of claim 6, wherein said orientation mode selecting further comprises:
(p) when the determination in (n) is false, storing an orientation mode of 0 degrees.

8. The method of claim 2, wherein said orientation mode selecting further comprises:
(q) when the determination in (d) is false, storing an orientation mode of 90 degrees in the memory.

9. The method of claim 2, wherein said orientation mode selecting further comprises:
(r) when the determination in (e) is false, storing an orientation mode of 0 degrees in the memory.

10. The method of claim 1, wherein the orientation parameters comprise at least one of an image start position, an image end position, and a scanning direction, which correspond to the determined orientation mode.

11. An apparatus of controlling an orientation of image data, the apparatus comprising:
a display panel being rotatable about at least one axis, the rotation of said display panel setting an orientation of the display panel, the display panel rotation being selectable according to each of a plurality of rotation angles, each rotation angle corresponding to an orientation mode for determining a display angle of original image data;
an orientation mode detector configured to detect the set orientation of the display panel, and to determine the orientation mode based on the detected orientation;
a system memory configured to store orientation parameters corresponding to a plurality of image orientation modes;
a system controller configured to acquire information indicating the determined orientation mode from the orientation mode detector, and to extract orientation parameters corresponding to the acquired information; and
a driver configured to change an orientation of the original image data according to the extracted orientation parameters, wherein the orientation-changed image data is stored in the system memory and is displayed on a display screen,
wherein the orientation mode detector comprises a display memory, configured to store the information indicating the determined orientation mode, and a display controller for sending an acknowledgment to the system controller when a request for access to the display memory is received.

12. The apparatus of claim 11, wherein the display panel is rotatable about an axis perpendicular to the display panel.

13. The apparatus of claim 12, wherein the display panel is rotatable about a horizontal axis.

14. The apparatus of claim 11, wherein the orientation mode detector further comprises:
at least one sensor configured to measure the rotational angles of the display panel,
wherein the display controller is configured to determine the orientation mode for the original image data based on the measured rotational angles.

15. The apparatus of claim 14, wherein the at least one sensor comprises any one of a gyroscope sensor, a metal shell sensor, an electrical conduction detection switch, and a mechanical conversion switch.

16. The apparatus of claim 14, wherein the at least one sensor comprises:
a first sensor configured to measure a first rotational angle of the display panel about a first axis perpendicular to the display panel; and
a second sensor configured to measure a second rotational angle of display panel about a second axis perpendicular to the first axis.

17. The apparatus of claim 14, wherein the orientation mode for the original image data is any one of 0, 90, 180, and 270 degrees orientation modes.

18. The apparatus of claim 11, wherein the extracted orientation parameters comprise at least one of an image start position, an image end position, and a scanning direction, which correspond to the determined orientation mode.

19. A method of controlling an orientation of image data in a display system having a display panel, the method comprising:
assigning a display orientation to each of a plurality of orientation modes for original image data, each orientation mode for determining a display angle of the original image data, the display angle corresponding to an orientation of the display panel about at least one axis;
setting the orientation of the display panel;
selecting one among the plurality of orientation modes based on the set orientation; and
displaying the original image data according to the selected orientation mode,
wherein the orientation mode selecting comprises determining whether a request for access to a memory, configured to store information indicating the orientation mode, has been received from an image orientation controller and transmitting an acknowledgement to the image orientation controller for authorizing access to the memory when the request is received.

20. The method of claim 19, further comprising:
manually rotating the display panel about the at least one axis to establish the orientation mode for original image data; and
extracting orientation parameters corresponding to the established orientation mode,
wherein the display orientation of the original image data is set according to the extracted orientation parameters.

21. The method of claim 20, wherein the plurality of orientation modes includes a 0 degrees orientation mode, and a 90 degree s orientation mode, a 180 degrees orientation mode, and a 270 degrees orientation mode with respect to the at least one axis.

22. The method of claim 21, wherein the plurality of orientation modes further includes a 0 degrees orientation mode and a 180 degrees orientation mode with respect to a rotation axis perpendicular to the at least one axis.

23. The method of claim 20, wherein the orientation mode is determined by:
   manually rotating the display panel about the at least one axis to establish a rotational angle with respect to the at least one axis; and
   storing, in a system memory, orientation parameters corresponding to the established rotational angle.

24. The method of claim 20, wherein the orientation mode is determined by:
   manually rotating the display panel about at least two axes to establish a rotational angle with respect to each of the at least two axes; and
   storing, in a system memory, orientation parameters corresponding to the established rotation angles.

25. The method of claim 20, further comprising:
   storing the orientation-set image data in a display memory; and
   displaying the stored image data on a display screen.

\* \* \* \* \*